United States Patent [19]
Schmid et al.

[11] Patent Number: 5,516,087
[45] Date of Patent: May 14, 1996

[54] CLAMPING DEVICE

[75] Inventors: Clemens Schmid, Weissach; Gerhard Kloepfer, Pleidelsheim, both of Germany

[73] Assignee: Bessey & Sohn GmbH & Co., Bietigheim-Bissingen, Germany

[21] Appl. No.: 289,787

[22] Filed: Aug. 12, 1994

[30] Foreign Application Priority Data

Aug. 19, 1993 [DE] Germany ............................ 43 27 861.2

[51] Int. Cl.⁶ ...................................................... B23Q 3/02
[52] U.S. Cl. ............................... 269/93; 269/94; 269/226; 269/91
[58] Field of Search ................................... 269/91, 93–94, 269/99–101, 238, 225, 226, 285, 250–253, 234, 309

[56] References Cited

U.S. PATENT DOCUMENTS

| | | | |
|---|---|---|---|
| 2,994,236 | 8/1961 | McCormick | 269/94 |
| 4,496,139 | 1/1985 | Lenz | 269/93 |
| 4,500,081 | 2/1985 | Carossino | 269/94 |
| 4,577,847 | 3/1986 | Schedwin | 269/309 |
| 5,167,405 | 12/1992 | Cayley | 269/309 |

FOREIGN PATENT DOCUMENTS

| | | |
|---|---|---|
| 57422 | 7/1891 | Germany . |
| 1109491 | 6/1961 | Germany . |
| 8226230 | 7/1983 | Germany . |
| 07748 | of 1914 | United Kingdom . |
| 2228694 | 9/1990 | United Kingdom . |

OTHER PUBLICATIONS

Database WPI, Week 8415, Derwent Publications Ltd., London, Great Britain; AN 84–092785 & SE–A–432 553, Feb. 26, 1984.

*Primary Examiner*—Robert C. Watson
*Attorney, Agent, or Firm*—Barry R. Lipsitz; Ralph F. Hoppin

[57] ABSTRACT

In order to improve a clamping device, in particular for clamping workpieces on a machine table, comprising a housing securable in position on a support surface of a carrier by means of an anchoring element, a clamping element movable relative to the housing and having a clamping arm projecting from the housing and a clamping spindle rotatably mounted on the housing for moving the clamping element, such that the housing can be secured in place on the support surface in as simple a manner as possible, it is suggested that a fastening element supported on the housing be movable relative to the housing from a first position into a second position for securing the housing in position, that in the first position the housing be detachable from the support surface and that in the second position the fastening element secure the housing in position on the support surface by acting on the anchoring element with a fastening force.

25 Claims, 5 Drawing Sheets

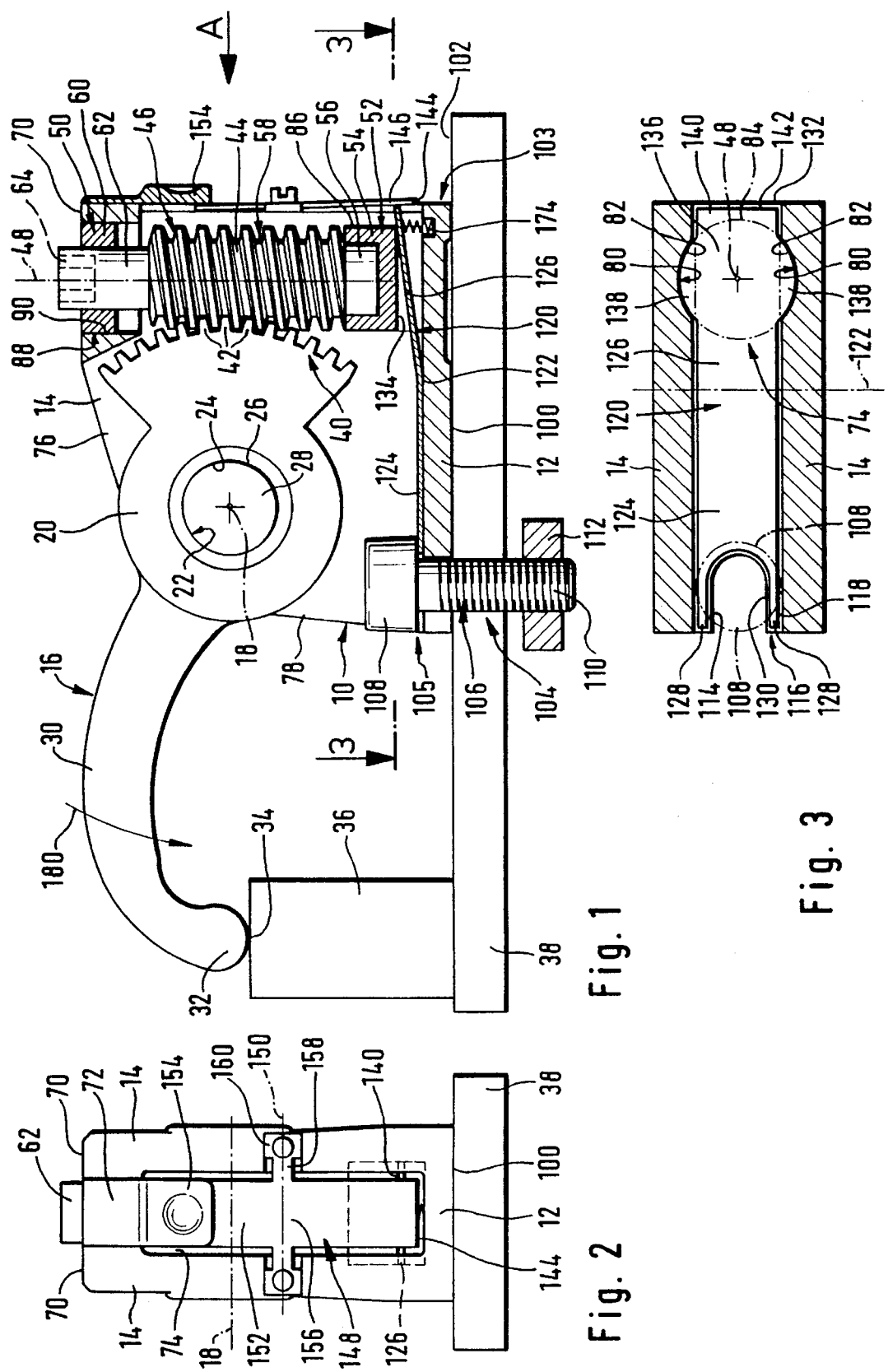

CLAMPING DEVICE

BACKGROUND OF THE INVENTION

The invention relates to a clamping device, in particular for clamping workpieces on a machine table, comprising a housing securable in position on a support surface of a carrier by means of an anchoring element, a clamping element movable relative to the housing and having a clamping arm projecting from the housing and a clamping spindle rotatably mounted on the housing for moving the clamping element.

Clamping devices of this type are known, for example, from German Utility Model G 92 11 624.4. In clamping devices of this type, the anchoring element is a screw which is accessible only from the side of the housing due to the clamping arm and so tightening of this screw to fix the housing in place on the support surface is, in many cases, awkward.

The object underlying the invention is therefore to improve a clamping device of the generic type such that the housing can be secured in place on the support surface in as simple a manner as possible.

SUMMARY OF THE INVENTION

This object is accomplished in accordance with the invention, in a clamping device of the type described at the outset, in that a fastening element supported on the housing is provided, that the fastening element is movable relative to the housing from a first into a second position for securing the housing in position and that in the first position the housing is detachable from the support surface and that in the second position the fastening element secures the housing in position on the support surface by acting on the anchoring element with a fastening force.

The advantage of the inventive solution is to be seen in the fact that in this case it is not necessary for an operator to act directly on the anchoring element but only on the fastening element which offers the possibility of arranging this action on the fastening element to be as user-friendly as possible from the point of view of both accessibility and the force of the action.

The fastening element is advantageously effective, in particular, when this braces the housing, the anchoring element and the carrier against one another in the second position.

It is possible to fix the housing particularly well on the support surface when the fastening element acts on the anchoring element in the second position with a fastening force directed away from the support surface.

The fastening element can act on the anchoring element in any optional manner within the scope of the embodiments described so far. It is, however, particularly advantageous for the fastening element to act on a head of the anchoring element since, in this case, the fastening element can be designed in a constructionally simple manner.

In a particularly expedient embodiment, the fastening element engages under the head in the second position and acts on it in a direction pointing away from a base portion of the housing. This means that the anchoring element and the housing as well as the carrier can be braced against one another in a particularly simple manner.

In conjunction with the embodiments described thus far, the arrangement of the fastening element in the housing itself and its support have not been specified in detail and so all possibilities of supporting the fastening element in the housing are conceivable. From a constructional point of view, it has proven to be particularly simple for the fastening element to be supported on the base portion of the housing.

With respect to the design of the fastening element itself, no details have so far been given. In one advantageous embodiment, for example, the fastening element comprises a tiltable fastening lever which acts on the anchoring element, in particular, with an end region. For example, the tiltable lever can be designed as a one-armed lever and act on the anchoring element with its end remote from the tilt axis.

It has proven to be particularly advantageous, in particular for the actuation thereof, for the fastening lever to be a rocker. In this case, it is, for example, provided for the rocker to act on the anchoring element in the second position with a first arm and be acted upon in the region of a second arm.

In order to be able to act on the anchoring element always with an essentially comparable force in the second position of the fastening element, especially when the clearance between the fastening element and the anchoring element varies considerably in the first position, it is preferable for the fastening element to comprise an elastic biasing means.

For example, this elastic biasing means is designed such that it can be brought from a tension-less state into a tensioned state. In this respect, the biasing means is, in particular, in the tension-less state in the first position of the fastening element and in the tensioned state in the second position of the fastening element.

It is, however, also conceivable to provide merely different degrees of tensioned state of the elastic biasing means.

The fastening element is, preferably, designed such that the elastic biasing means acts on the anchoring element with the fastening force in the tensioned state.

In a particularly simple and advantageous solution from the constructional point of view, the elastic biasing means and the fastening lever form a single part. In this case, the fastening lever or the rocker are designed as a spring lever or spring rocker and they, therefore, combine in themselves both the function of a lever as well as that of the elastic biasing means.

In this respect, the spring lever or the spring rocker can, for example, be brought into the tensioned state by the action of a pressure region provided for this purpose.

With respect to the question of the actuatability of the fastening element, no details have so far been given in conjunction with the embodiments described in the above. It is, for example, particularly advantageous for the fastening element to be actuatable from a region located outside a front region of the housing. This makes it considerably easier to actuate the fastening element since the front region of the housing, in particular, is close to the workpiece and actuation is also made more difficult due to the room required for movement of the clamping arm.

It has proven to be particularly expedient for the fastening element to be actuatable from a rear region of the housing, in particular as the rear region of the housing is not in such danger of becoming soiled as the front region facing the workpiece. An additional advantage is to be seen in the fact that the rear region of the housing is, normally, more easily accessible than the front region facing the workpiece and, if necessary, other clamping devices.

One possibility would be to actuate the fastening element proceeding from a rear side wall region of the housing. Alternatively thereto, it is advantageous for the fastening element to be actuatable proceeding from an upper side of the housing.

Alternatively or in addition hereto, it is advantageous for the fastening element to be actuatable from the rear side of the housing.

In a particularly advantageous solution of the invention, the fastening element is movable by the clamping spindle from the first into the second position. This solution allows the fastening element to be moved from the first into the second position at the same time by the elements required in any case for the actuation of the clamping spindle.

The fastening element could be actuated via the clamping spindle either by utilizing a rotary movement of the clamping spindle or also by means of an element meshing with the clamping spindle. It is, however, particularly advantageous for the fastening element to be brought from the first into the second position by an axial displacement of the clamping spindle. This solution therefore provides for a type of movement of the clamping spindle for the actuation of the fastening element which is not immediately necessary for the movement of the clamping element.

The most varied of solutions are conceivable for transferring the axial displacement of the clamping spindle to the fastening element.

It has proven to be particularly expedient for the fastening element to be brought from the first into the second position by an axial bearing of the clamping spindle guided for movement in the housing, whereby the axial bearing, in particular, acts on the fastening element in the case of a fastening lever or a rocker.

An axial displacement of the clamping spindle can be attained by the most varied of possibilities. For example, this would be possible in the case of an axially displaceable clamping spindle in that the clamping spindle is axially displaced by manually operating the clamping arm.

A particularly large forge for transferring the fastening element from the first into the second position, which is particularly desirable when an elastic biasing means is provided in the fastening element, provides for the fastening element to be brought into the second position via a displacement of the clamping spindle when movement of the clamping element is blocked. Such a blocking of the movement of the clamping element can, for example, be achieved by the clamping element pressing on a workpiece or on the machine table or also by the clamping element running against a stop which is provided, for example, on the housing.

Within the scope of the embodiments described thus far, details have been given only on how the fastening element is intended to be transferred from the first into the second position.

No details have, however, been given as to how the fastening element is intended to be held in the second position in order to thereby fix the housing securely in position in relation to the support surface.

For this reason, it is particularly advantageous for the fastening element to be securable in the second position by a holding element.

Such a securing of the fastening element in position could, for example, take place by non-positive connection. It is, however, even more advantageous, particularly with respect to the operational safety of the inventive clamping device, for the fastening element to be securable in the second position by the holding element by positive connection.

The holding element can be designed in the most varied of ways. For example, the holding element could be a bolt blocking the fastening element in its second position. It is, however, particularly expedient for the holding element to be designed as a locking element.

In a constructionally advantageous solution, the locking element abuts in its locking position on a locking surface of the fastening element, preferably with a holding surface integrally formed on the locking element.

In order to ensure that the locking element transfers automatically into its locking position and also remains in it, it is preferable for the locking element to be biased in the direction of its locking position.

In this case, an actuating element, with which the locking element can be moved out of its locking position, is expediently provided.

With respect to the arrangement of the holding element, no details have so far been given. It is particularly favourable for the holding element to be arranged in a rear region of the housing so that it can also be actuated without problem.

It is particularly expedient for the holding element to be arranged at a rear side of the housing and to be actuatable from there.

Alternatively to providing a fastening lever or a rocker as fastening element, in a further, preferred embodiment the fastening element comprises a wedge element which is mounted for displacement in the housing.

This wedge element is preferably displaceable on a corresponding wedge surface of the base portion in order to likewise act on the anchoring element with a force directed away from the support surface.

In order to be able to actuate such a wedge element in a simple manner, a spindle, with which the wedge element is displaceable from the first into the second position and, if required, vice versa, is preferably mounted on the housing.

In order to be able to mount the spindle on the housing in a simple manner, a preferred embodiment provides for the spindle to be mounted in a foot portion of an axial bearing of the clamping spindle.

This foot portion is preferably insertable, together with the axial bearing of the clamping spindle, from an upper side of the housing, in the same way as in the solutions known so far.

In all the embodiments of the inventive solution described so far, it is expedient for the clamping element to be pivotable about an axis relative to the housing, whereby the clamping element preferably has a bearing portion mounted on the housing for rotation about the axis and a clamping arm projecting from this.

In particular, it is also provided for the clamping spindle to engage in a toothed rim of the bearing portion in order to pivot the clamping arm, as well, due to rotation of the bearing portion about the axis.

Additional features and advantages of the inventive solution are the subject matter of the following description as well as the drawings of several embodiments.

BRIEF DESCRIPTION OF THE DRAWINGS

FIG. 1 shows a longitudinal section through a first embodiment of an inventive clamping device;

FIG. 2 is a view in the direction of arrow A in FIG. 1;

FIG. 3 is a section along line 3—3 in FIG. 1;

DETAILED DESCRIPTION OF THE INVENTION

Figure 4:
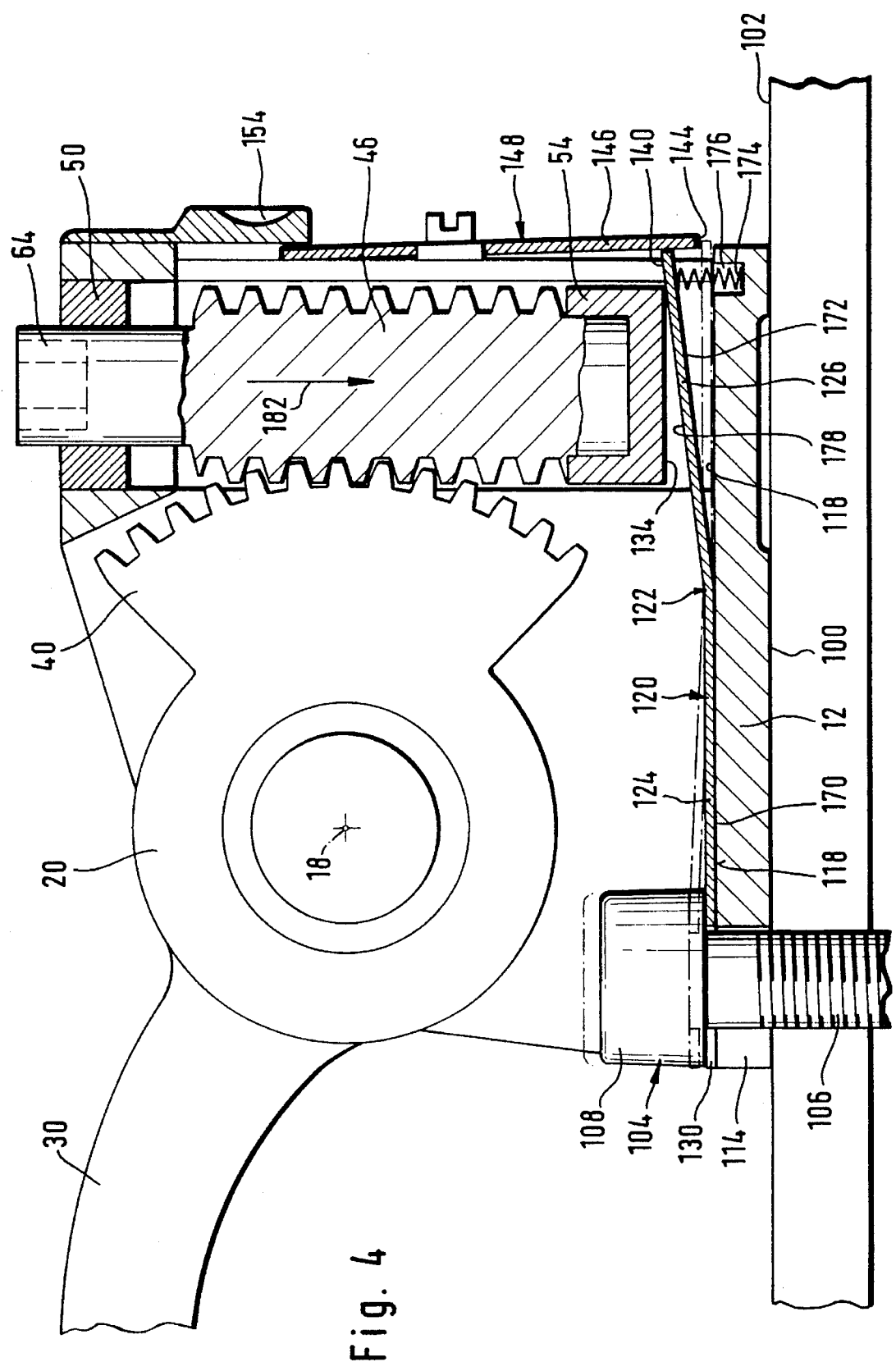
FIG. 4 is an enlarged representation of a lower region of the first embodiment in a longitudinal section similar to FIG. 1 with a fastening element in the first position.

A first embodiment of an inventive clamping device, illustrated in FIGS. 1 and 2, comprises a housing designated as a whole as 10, a base portion 12 and two side walls 14 rising from the base portion 12 at a distance from one another. A clamping element designated as a whole as 16 is mounted on this housing 10 for rotation about an axis 18, whereby this clamping element 16 has a bearing portion 20 which is located between the side walls 14 of the housing 10 and has a circular-cylindrical opening 22 which, with its cylinder shell surface 24, is seated on a cylindrical outer shell surface 26 of a bearing cylinder designated as a whole as 28, the cylinder shell surfaces 24 and 26 being arranged coaxial to the axis 18. The bearing cylinder 28 is, preferably, non-rotatably connected to the housing 10 so that the bearing portion 20 is guided on the cylinder shell surface 26 with the cylinder shell surface 24 of the opening 22 for rotation about the axis 18.

A clamping arm 30 of the clamping element extends from the bearing portion 20 and out of the housing 10. This arm bears a clamping surface 34 at its front end 32 facing away from the bearing portion 20. A workpiece 36 can, for example, be firmly secured on a machine table 38 with this clamping surface 34 when acted upon by means of the clamping arm 30.

In order to act on the workpiece 36 by means of the clamping surface 34, the clamping element 16 is provided with a toothed rim 40 which is integrally formed, for example, onto the bearing portion 20 and likewise located between the two side walls 14. This toothed rim 40 engages each time with some of its teeth 42 in threads 44 of a clamping spindle designated as a whole as 46, this clamping spindle being mounted in the housing 10 for rotation about a spindle axis 48. The clamping spindle 46 is hereby mounted by an upper radial bearing 50 and a lower radial and axial bearing 52, whereby the radial and axial bearing 52 preferably comprises a bearing bush 54 shaped like a cup, into which a bearing bolt 56 of the clamping spindle 46 engages, this bolt being integrally formed onto a threaded section 58 of the clamping spindle 46 bearing the threads 44.

The radial bearing 50 comprises, for its part, a bearing ring 60 which is penetrated by a stay bolt 62 of the clamping spindle 46. This bolt is, for its part, integrally formed onto the threaded section 58 and has at an end opposite the threaded section 58 a receiving means 64, for example in the shape of a hexagon for a tightening key, which protrudes beyond an upper side of the housing 10.

As illustrated in FIG. 2, the housing 10 comprises in a rear region 103 facing away from the clamping arm 30 a bridge 72 connecting the two side walls 14 in the region of their upper edges 70 so that a free space 74 located between the side walls 14 remains between the bridge 72 and the base portion 12, this free space extending parallel to the side walls 14 through the entire housing 10 and merging in the region of the bearing portion not only into an upper opening 76 but also into a front opening 78.

Recesses 80 worked into the side walls 14 extend above the base portion 12 parallel to the spindle axis 48 and on both sides of the free space 74. These recesses each have a cross section like a circular segment so that recess surfaces 82 thereof are partial surfaces of a cylinder surface 84 indicated by a dash-dot line in FIG. 3 and extending coaxially to the spindle axis 48. The two recesses 80 guide the bearing bush 54 with its likewise cylindrical outer shell surface 86 so as to be displaceable in the direction of the spindle axis 48. The two recesses 80 open into an opening 88 through the bridge 72, whereby opening surfaces 90 represent a continuation of the cylinder shell surface 84. The bearing ring 60 is inserted in the opening 88 and abuts with a press fit against the opening surfaces 90 and is therefore non-displaceable in the direction of the spindle axis 48.

The entire clamping spindle 46 is therefore axially displaceable in the direction of the spindle axis 48, whereby this is brought about by an axial sliding of the stay bolt 62 in the bearing ring 60 seated with a press fit in the opening 88 and by a likewise axial sliding of the radial and axial bearing 52 in the recesses 80.

The housing 10 is supported with a base surface 100 on a support surface 102 of the machine table 38 and is anchored on the machine table 38 by an anchoring element 104 which engages in a front region 105 of the housing 10 located opposite a rear region 103 accommodating the clamping spindle 46. The anchoring element 104 comprises, in the simplest case, a screw 106 with a head 108, proceeding from which a threaded section 110 extends. This section is, for its part, screwed into a sliding block 112 likewise comprised by the anchoring element 104, whereby the sliding block 112 is insertable into T-shaped grooves in the machine table 38 and is slidingly displaceable therein.

The screw 106 is thereby arranged such that its threaded section 110 passes through a U-shaped recess 114 in the base portion 12 which is open towards a front side 116 so that the base portion 12 can be pushed under the head 108 of the screw 106 with the U-shaped recess 114 surrounding the threaded section 110 so that the head 108 engages over a surface 118 of the base portion 12 on both sides of the U-shaped recess 114. In addition, a spring rocker 120 serving as fastening element is arranged on the surface 118 and the base portion 12. This spring rocker is tiltable about a tilt axis 122 and has a first arm 124 and a second arm 126.

The first arm 124 extends from the tilt axis 122, which is arranged approximately in a central region of the base portion 12 and aligned approximately parallel to the axis 18, in the direction of the anchoring element 104 and engages with two fork-like fingers 128 around a U-shaped recess 130 lying therebetween and having approximately the same dimensions as the recess 114. The two fingers 128 likewise engage around the threaded section 110 of the screw 106 and beneath the head 108.

The second arm 126 extends in the opposite direction to the first arm 124 as far as a rear side 132 of the housing 10 and engages beneath a lower pressure surface 134 of the bearing bush 54 with a pressure region 136 which is located exactly under the lower pressure surface 134 of the bearing bush 54. To secure the spring rocker 120 in place, side vanes 138 are integrally formed onto the second arm 126 on both sides in the pressure region 136. These vanes each engage laterally into the recesses 80 and preferably abut against the recess surfaces 82 in order to secure the entire spring rocker 120 against any displacement parallel to the side walls 14.

The spring rocker 120 also comprises a locking surface 140 which is integrally formed on the second arm 126, namely at an end facing the rear side 132, and is essentially directly adjacent to a rear edge 142 of the second arm 126.

This locking surface 140 can be brought beneath a holding surface 144 of a locking tongue 146, whereby the holding surface 144 rests on the locking surface 140. The locking tongue 146 forms an arm of a locking rocker designated as a whole as 148. This locking rocker is tiltable about a tilt axis 150, which extends approximately parallel to the axis 18, and comprises an actuating arm 152 which extends on the side of the tilt axis 150 opposite the locking tongue 146 and via which the locking rocker 148 is actuated. For this purpose, a pressure member 154 is preferably provided which is held flexibly on the housing 10.

In order to bias the locking tongue 146 for movement in the direction to engage over the locking surface 140, the locking rocker 148 comprises torsion webs 158 which bear supporting vanes 160 and protrude in the region of the tilt axis 150 on both sides from a central member 156 connecting the locking tongue 146 and the actuating arm 152.

The locking rocker 148 is secured to the two side walls 40 with these supporting vanes 160 such that the torsion webs 158 are subject to torsion and act on the locking tongue 146 with a torsional moment such that this tongue endeavours to engage over the locking surface 140 with the holding surface 144.

Due to the fact that the first arm 124 and the second arm 126 of the spring rocker 120 form an angle of less than 180° between them, the first arm 124 rests in a first position illustrated in FIG. 4 with its underside 170 on the surface 118 of the base portion 12 whereas the second arm 126 extends with its underside 172, proceeding from the tilt axis 122, at an acute angle to the upper side 118 of the base portion 12. In order to fix this position of the spring rocker 120, an auxiliary pressure spring 174 is provided which is supported in a recess 176 in the base portion 12 and presses against the underside 172 of the second arm 126 behind the bearing bush 54, preferably near the rear edge 142, in order to keep this second arm at the maximum possible distance from the surface 118 and to keep the first arm 124 resting on the base portion 12.

In this first position of the spring rocker 120, the bearing bush 54 rests with its pressure surface 134 on an upper side 178, namely in the pressure region 136 of the second arm 126. For this purpose, it is necessary for the clamping element 16 not to press in a clamping direction 180 against a resistance, for example the workpiece 36, so that the clamping spindle 46 is not subject to any reaction force 182 in the direction of the base portion 12.

In this case, the anchoring element 104 is preferably set such that the head 108 engages over the fingers 128 of the first arm 124 with clearance and thus the housing 10 is movable such that the threaded section 110 slides into the U-shaped recesses 114 and 130 or out of them.

If the clamping element 16 is turned due to rotation of the clamping spindle 46 to such an extent that it experiences a resistance, for example acts on the workpiece 36 with the clamping arm 30, the reaction force 182 will act on the clamping spindle 46 during further rotation and move this, together with the bearing bush, in the direction of the base portion 12 so that the bearing bush 54 acts with its lower pressure surface 134 on the upper side 178 of the second arm 126 and presses this so far downwards until its underside 172 rests on the surface 118 of the base portion 12.

This means that the spring rocker 120 is then in its second position. In this position, the first arm 124 is raised off the surface 118 with its underside 170 and presses with its fingers engaging under the head 108 against an underside 184 of the head 108 so that the anchoring element 104 is subject as a whole to a fastening force 186 which is directed away from the support surface 102. The movement of the first arm 124 away from the surface 118 of the base portion 12 is, however, less than that of the second arm 126 in the direction of the base surface 118 so that the spring rocker 120 is, in the second position, in a tensioned state and acts as an elastic biasing means which acts on the head 108 of the anchoring element 104.

As a result of the spring rocker 120 being supported in the region of its tilt axis 122 on the surface 118 of the base portion 12, the base portion 12 is acted upon by the spring rocker 120, as a countermove to the action on the head 108, in the direction of the support surface 102 and therefore the base portion 12 is pressed with its base surface 100 against the support surface 102.

In the second position of the spring rocker 120, the housing is therefore braced relative to the machine table 38 and the anchoring element 104 not only relative to the housing 10 but also relative to the machine table 38 so that, as a whole, the housing 10 is securely fixed in place on the machine table 38.

Figure 5:
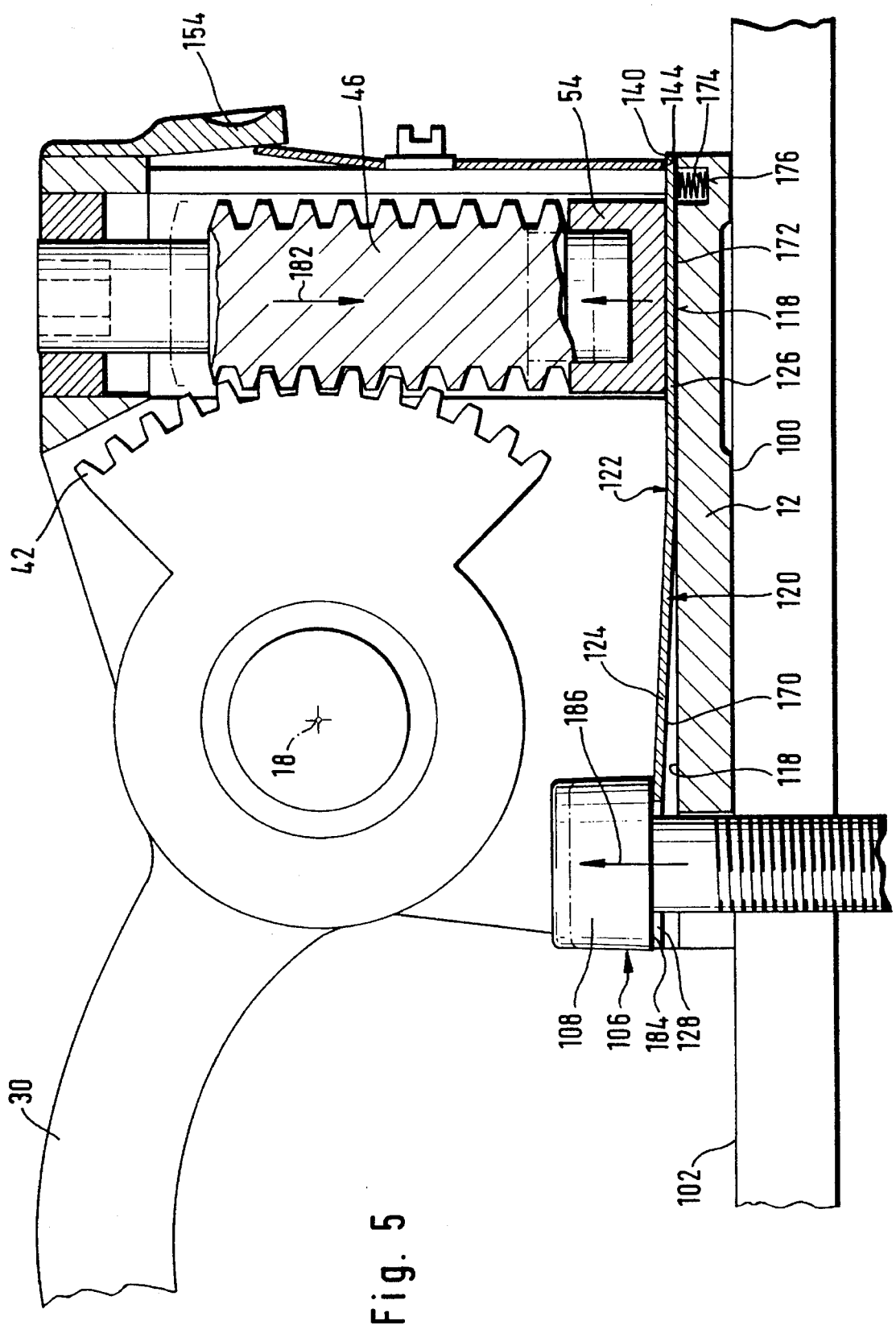
FIG. 5 is a representation similar to FIG. 4 with the fastening element in the second position.

In the first position of the spring rocker 120, the locking tongue 146 rests against the rear edge 142 of the second arm 126, whereby the second arm 126 is freely movable. The locking tongue 146 is, however, held in engagement on the rear edge 142 due to the torsion of the torsion webs 148. During transition of the spring rocker 120 into the second position, illustrated in FIG. 5, the second arm 126 is moved along the locking tongue 146 to such an extent that the holding surface 144 has the possibility of sliding over the locking surface 140 and therefore of preventing the second arm 126 from jumping back into the first position. The locking tongue 146, in its locking position, secures the spring rocker 120 in its second position by interlocking so that the housing 10 remains secured in place in relation to the machine table 38.

It is possible to release the locking of the spring rocker 120 in the second position by actuating the pressure member 154 which acts on the actuating arm 152 and therefore counteracts the action of the torsion webs 158 on the locking tongue 146 so that the locking tongue 146 pivots in the direction of the rear side 132 of the housing 10, the holding surface 144 slides away over the locking surface 140 in the direction of the rear edge 142 and therefore the second arm 126 has the possibility, aided by the pressure spring 174, of pivoting back into the first position.

The inventive clamping device can be mounted on the machine table 38 such that, first of all, in the first position of the spring rocker 120 the anchoring element 110 is brought into loose engagement with the housing 10, i.e. the recesses 114 and 130, the spring rocker 120 is then brought into the second position by turning the clamping spindle 46 and pivoting the clamping arm 30 in the clamping direction 180 against an abutment, for example a workpiece 36. In this second position, the spring rocker braces the housing 10, the anchoring element 104 and the machine table 38 against one another. Since the spring rocker 120 is automatically locked in the second position by means of the locking tongue 146, the clamping spindle 46 can be released again and the clamping element 16 freely moved. The housing 10 still remains secured in position relative to the machine table and the anchoring element 104. This means that optional clamping procedures can now be carried out by means of the housing 10 fixed on the machine table 38. To release the housing 10 from the machine table 38 it is merely necessary to actuate the pressure member 154, whereby the locking of the spring rocker 120 in the second position is released and this returns again to the first position, aided by the pressure spring 174.

Figure 6:
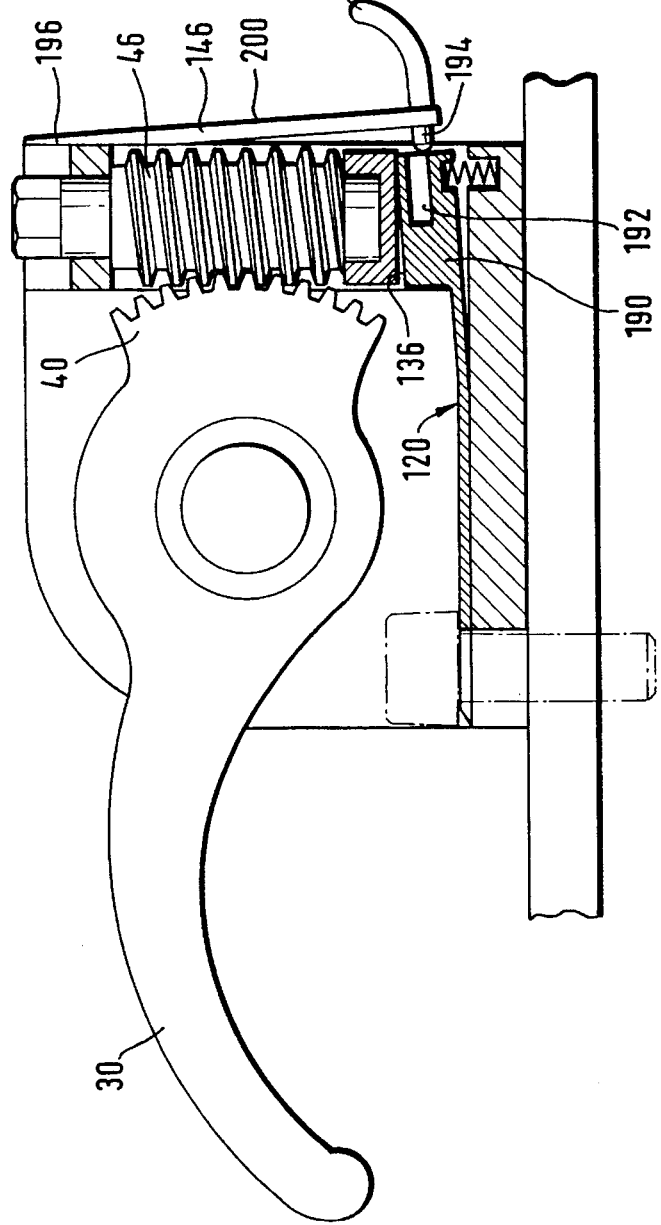
FIG. 6 is a longitudinal section through a second embodiment of an inventive clamping device with the fastening element in the first position.

In a second embodiment, illustrated in FIG. 6, those parts which are identical with those of the first embodiment have been given the same reference numerals. With respect to these parts, reference is made to the comments on the first embodiment.

Figure 7:
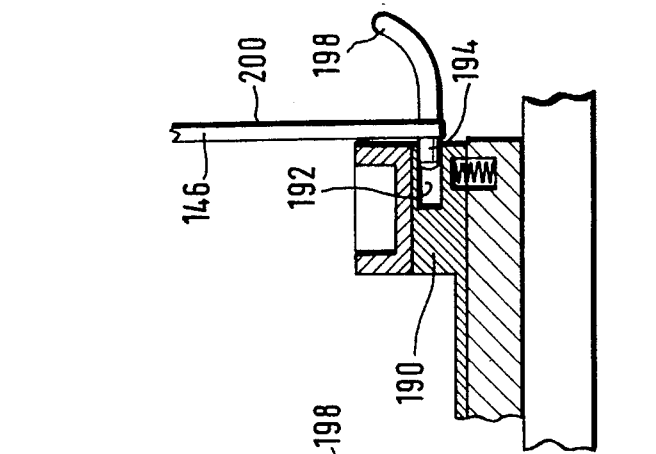
FIG. 7 is a partial detail of the second embodiment similar to FIG. 6 with the fastening element in the second position.

In contrast to the first embodiment, the spring rocker 120 is provided in the region of the second arm 126 with a pressure member 190 which bears the pressure region 136. A bore 192 open towards the rear edge 142 is introduced into this pressure member 190 and a locking nose 194 can be brought into engagement with this bore in the second position, illustrated in FIG. 7. This locking nose 194 is likewise held on the locking tongue 146, whereby the locking tongue, for its part, is resilient in design and held with an end region 196 securely on the two side walls 14.

In order to disengage the locking nose 194 from the bore 192 in the second position of the spring rocker 120, a handle 198 is provided on the locking tongue, preferably at the level of the locking nose. This handle protrudes from a rear side 200 of the locking tongue 146 so that when the handle 198 is pulled the locking nose 194 is movable out of the bore 192.

Figure 8:
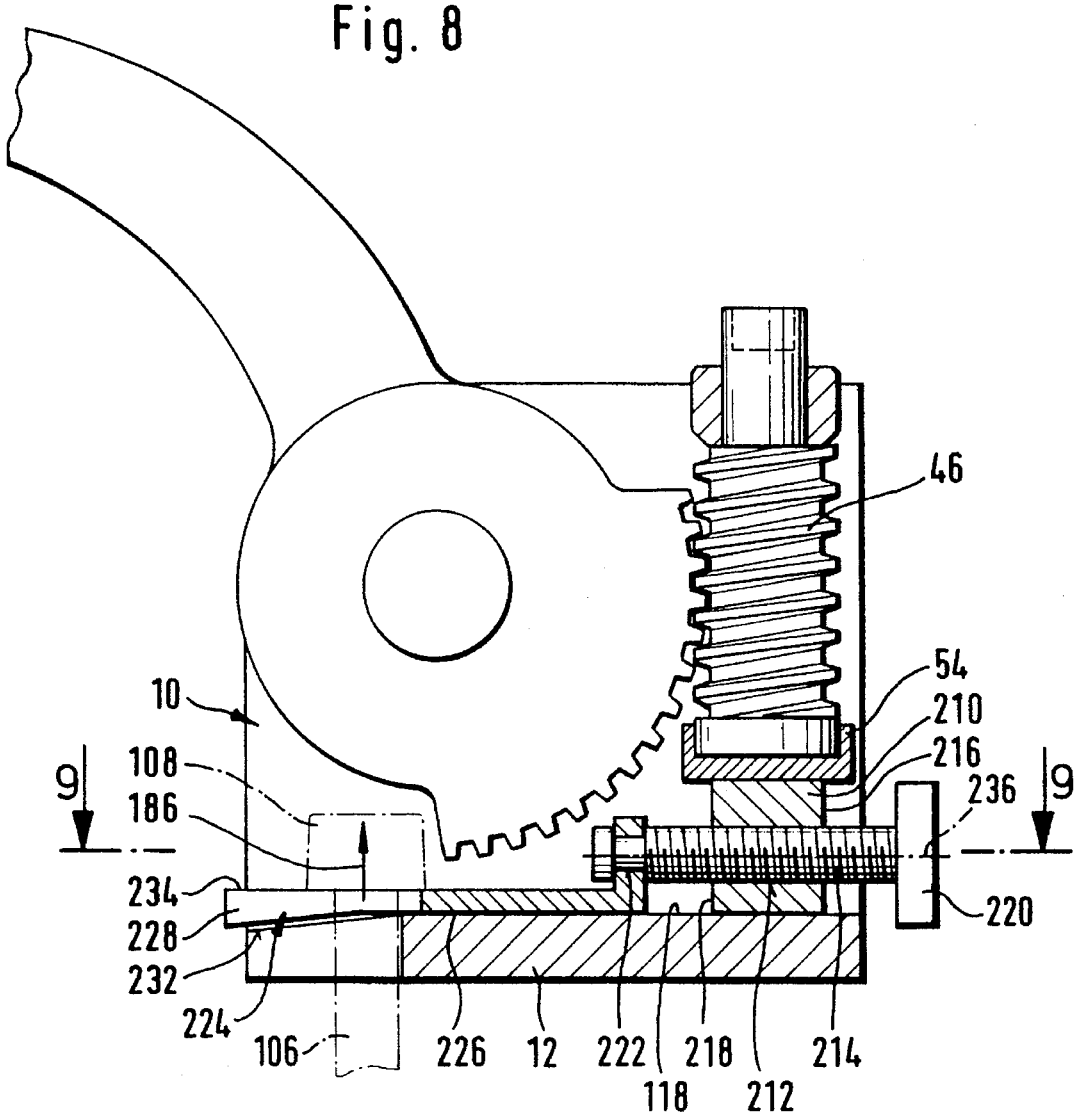
FIG. 8 is a longitudinal section through a third embodiment of an inventive clamping device.

In a third embodiment of an inventive solution, illustrated in FIG. 8, those parts which are identical with those of the first embodiment have been given the same reference numerals so that with respect to their description reference can be made to the comments on the first embodiment.

In contrast to the preceding embodiments, the clamping spindle 46 is not held in the housing 10 so as to be axially displaceable but axially non-displaceable, whereby the bearing bush 54 is supported via a foot portion 210 on the surface 118 of the base portion 12. This foot portion 210 has a threaded bore 212, into which a spindle 214 is screwed. This spindle extends approximately parallel to the surface 118 through the foot portion 210 from a rear side 216 as far as a front side 218 thereof and protrudes on the front side 218 beyond the foot portion 210. In addition, the spindle 214 likewise protrudes beyond the rear side 214 of the foot portion 210 and bears a turning handle 220 with which the spindle 214 can be turned.

Figure 9:
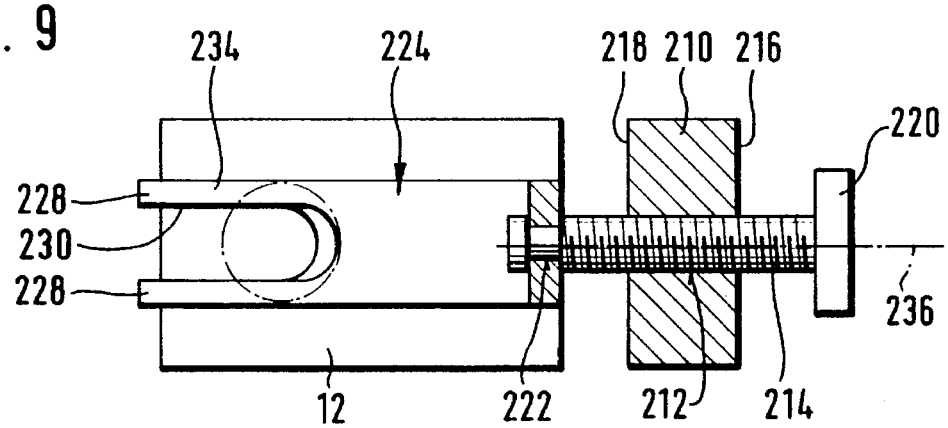
FIG. 9 is a partial section along line 9—9 in FIG. 8.

At its end facing the front region 105 of the housing, the spindle 214 is provided with a spindle bearing 222 which is rigidly connected to a wedge slide 224. This wedge slide 224 rests with an underside 226 on the surface 118 of the base portion and has, as illustrated in FIG. 9, likewise two fingers 228 which form between them a U-shaped recess 230 which is designed to be approximately identical with the U-shaped recess 130 and the recess 114 in the base portion 12. The wedge fingers 228 form, as illustrated in FIG. 8, a wedge tapering in the direction of the spindle 214. This wedge rests on a correspondingly shaped wedge surface 232 of the base portion 12, whereby an upper side 234 of the wedge fingers 228 extends essentially parallel to the surface 118 of the base portion 12. By turning the spindle 214, this is displaceable relative to the foot portion 210 in the direction of its spindle axis 236 and due to the connection with the wedge slide 224 via the spindle bearing 222 the wedge slide 224 is likewise displaceable in the direction towards the foot portion 210 or away from it.

If the wedge slide 224 is pushed away from the foot portion 210 to its maximum, it is in the first position, in which the wedge fingers 228 engage under the head 108 of the anchoring element 104 with clearance. If, by turning the spindle 214, the wedge slide 224 is displaced in the direction of the foot portion 210, the wedge fingers 228 slide on the wedge surface 232 and the upper side 234 of the wedge fingers moves away from the surface 118 of the base portion 12 and therefore presses against the underside 184 of the head 108 so that this is likewise acted upon with the fastening force 186 and, in the same way as in the embodiments described in the above, the housing is braced relative to the machine table 38 and the anchoring element 104 is braced relative to the machine table 38 and the housing 10.

The foot portion 210 is preferably designed such that it is secured in the recesses 80 against any movement transversely to the spindle axis 48 while the foot portion 210 is likewise secured against any displacement in the direction of the spindle axis 48 due to the clamping spindle 46 being mounted in the housing 10 so as to be axially non-displaceable.

What is claimed is:

1. Clamping device, in particular for clamping workpieces on a machine table, comprising:

a housing securable in position on a support surface of a carrier of said machine table by means of an anchoring element;

a clamping element movable relative to the housing and having a clamping arm projecting from the housing;

a clamping spindle rotatably mounted on the housing for moving the clamping element;

a fastening element supported on the housing;

said fastening element being movable relative to the housing from a first position into a second position for securing the housing in position;

such that in the first position the housing is detachable from the support surface and, in the second position, the fastening element secures the housing in position on the support surface by acting on the anchoring element with a fastening force directed away from said support surface;

said fastening element comprising elastic biasing means tensioned in the second position.

2. Clamping device as defined in claim 1, characterized in that the fastening element braces the housing, the anchoring element and the carrier against one another in the second position.

3. Clamping device as defined in claim 1, characterized in that in the second position the fastening element acts on a head of the anchoring element.

4. Clamping device as defined in claim 3, characterized in that in the second position the fastening element acts on the head in a direction pointing away from a base portion of the housing.

5. Clamping device as defined in claim 1, characterized in that the fastening element is supported on the base portion of the housing.

6. Clamping device as defined in claim 1, characterized in that the fastening element is actuatable from a region located outside a front region of the housing.

7. Clamping device as defined in claim 6, characterized in that the fastening element is actuatable from a rear region of the housing.

8. Clamping device as defined in claim 1, characterized in that the fastening element is securable in the second position by the holding element by positive connection.

9. Clamping device as defined in claim 8, characterized in that the holding element is designed as a locking element.

10. Clamping device as defined in claim 9, characterized in that the locking element abuts in its locking position on a locking surface of the fastening element.

11. Clamping device as defined in claim 9, characterized in that the locking element is biased in the direction of its locking position.

12. Clamping device as defined in claim 11, characterized in that the locking element is movable out of its locking position by actuation of an actuating element.

13. Clamping device as defined in claim 1 wherein said fastening element is arranged in said housing.

14. Clamping device, in particular for clamping workpieces on a machine table, comprising:
- a housing securable in position on a support surface of a carrier of said machine table by means of an anchoring element;
- a clamping element movable relative to the housing and having a clamping arm projecting from the housing;
- a clamping spindle rotatably mounted on the housing for moving the clamping element;
- a fastening element supported on the housing;
- said fastening element comprising a tiltable fastening lever and being movable relative to the housing from a first position into a second position for securing the housing in position;
- such that in the first position the housing is detachable from the support surface and, in the second position, the fastening element secures the housing in position on the support surface by acting on the anchoring element with a fastening force.

15. Clamping device as defined in claim 14, characterized in that in the second position the fastening element acts on the anchoring element with a fastening force directed away from the support surface.

16. Clamping device as defined in claim 14, characterized in that the fastening element comprises a rocker tiltable about a tilt axis.

17. Clamping device, in particular for clamping workpieces on a machine table, comprising:
- a housing securable in position on a support surface of a carrier of said machine table by means of an anchoring element;
- a clamping element movable relative to the housing and having a clamping arm projecting from the housing;
- a clamping spindle rotatably mounted on the housing for moving the clamping element;
- a fastening element supported on the housing;
- said fastening element being movable relative to the housing from a first position into a second position for securing the housing in position;
- such that in the first position the housing is detachable from the support surface and, in the second position, the fastening element secures the housing in position on the support surface by acting on the anchoring element with a fastening force; wherein
- said fastening element is movable by the clamping spindle from the first into the second position.

18. Clamping device as defined in claim 17, characterized in that the fastening element is movable from the first into the second position by an axial displacement of the clamping spindle relative to the housing.

19. Clamping device as defined in claim 18, characterized in that the fastening element is movable from the first into the second position by an axial bearing of the clamping spindle, said bearing being guided for movement in the housing.

20. Clamping device as defined in claim 18, characterized in that the fastening element is adapted to be brought from the first into the second position via a displacement of the clamping spindle when movement of the clamping element is blocked.

21. Clamping device as defined in claim 17, characterized in that the fastening element is securable in the second position by a holding element.

22. Clamping device as defined in claim 21, characterized in that the holding element is arranged in a rear region of the housing.

23. Clamping device, in particular for clamping workpieces on a machine table, comprising:
- a housing securable in position on a support surface of a carrier of said machine table by means of an anchoring element;
- a clamping element movable relative to the housing and having a clamping arm projecting from the housing;
- a clamping spindle rotatably mounted on the housing for moving the clamping element;
- a fastening element supported on the housing;
- said fastening element being movable relative to the housing from a first position into a second position for securing the housing in position;
- such that in the first position the housing is detachable from the support surface and, in the second position, the fastening element secures the housing in position on the support surface by acting on the anchoring element with a fastening force directed away from said support surface; wherein
- said fastening element comprises a wedge element for generating said fastening force.

24. Clamping device as defined in claim 23, characterized in that the wedge element is displaceable from the first into the second position with a secondary spindle.

25. Clamping device as defined in claim 24, characterized in that the secondary spindle is mounted in a foot portion of an axial bearing of the clamping spindle.

* * * * *